United States Patent
Handte

(10) Patent No.: US 10,272,378 B2
(45) Date of Patent: Apr. 30, 2019

(54) FILTER DEVICE AND METHOD FOR CLEANING AT LEAST ONE FILTER ELEMENT, IN PARTICULAR BY USING SUCH A FILTER DEVICE

(71) Applicant: Camfil Handte APC GmbH, Tuttlingen (DE)

(72) Inventor: Jakob Handte, Bottighofen (CH)

(73) Assignee: Camfil Handte APC GmbH, Tuttlingen (DE)

( * ) Notice: Subject to any disclaimer, the term of this patent is extended or adjusted under 35 U.S.C. 154(b) by 0 days.

(21) Appl. No.: 14/698,987

(22) Filed: Apr. 29, 2015

(65) Prior Publication Data

US 2015/0306532 A1 Oct. 29, 2015

(30) Foreign Application Priority Data

Apr. 29, 2014 (DE) .......................... 10 2014 006 473

(51) Int. Cl.
| | |
|---|---|
| *B01D 46/00* | (2006.01) |
| *B01D 46/44* | (2006.01) |
| *B01D 46/24* | (2006.01) |
| *B01D 46/52* | (2006.01) |

(52) U.S. Cl.
CPC ..... *B01D 46/0064* (2013.01); *B01D 46/0068* (2013.01); *B01D 46/2403* (2013.01); *B01D 46/44* (2013.01); *B01D 46/521* (2013.01)

(58) Field of Classification Search
CPC .... B01D 46/00; B01D 46/0064; B01D 46/44; B01D 46/2403; B01D 46/0068; B01D 46/521

USPC .................. 55/368, 379, 381–382, 282–305, 55/341.1–341.7; 95/279, 19–22; 96/397
See application file for complete search history.

(56) References Cited

U.S. PATENT DOCUMENTS

| | | | | |
|---|---|---|---|---|
| 3,890,290 A | * | 6/1975 | McCabe ................ | B01D 46/02 210/136 |
| 4,372,713 A | * | 2/1983 | Kean, Jr. ................ | B65G 53/64 406/172 |
| 5,338,325 A | * | 8/1994 | Stanelle ................... | A01F 25/22 55/302 |
| 5,783,086 A | * | 7/1998 | Scanlon ................ | A47L 7/0042 210/416.1 |
| 5,845,782 A | * | 12/1998 | Depew ............... | B01D 46/0005 209/148 |
| 5,895,521 A | * | 4/1999 | Otsuka ............... | B01D 46/0001 55/302 |

(Continued)

*Primary Examiner* — T. Bennett McKenzie
(74) *Attorney, Agent, or Firm* — Gudrun E. Huckett

(57) ABSTRACT

A filter device has a housing and at least one filter element arranged in the housing. The filter element is provided with a filter material and the interior of the filter element is surrounded by the filter material. The filter element allows a raw gas to pass through the filter element from an exterior of the filter element to the interior. The interior of the filter element is divided into at least two interior chambers that are separated from each other. A cleaning device with compressed air lines that each are provided with an outlet opening and a valve is provided. The interior chambers each have associated therewith one of the compressed air lines. Through the outlet openings compressed air flows into the interior of the filter element for loading the interior of the filter element with compressed air.

11 Claims, 3 Drawing Sheets

(56) References Cited

U.S. PATENT DOCUMENTS

| | | | | |
|---|---|---|---|---|
| 6,290,752 B1* | 9/2001 | Koller | .................... | B01D 45/02 55/338 |
| 2009/0158697 A1* | 6/2009 | Magee | ............... | B01D 46/0002 55/492 |
| 2010/0031616 A1* | 2/2010 | Gillingham | ........ | B01D 46/0005 55/302 |
| 2011/0083407 A1* | 4/2011 | Weber | ................ | B01D 46/0068 55/293 |
| 2014/0360045 A1* | 12/2014 | Bartosik | ................ | F26B 21/08 34/474 |

* cited by examiner

FILTER DEVICE AND METHOD FOR CLEANING AT LEAST ONE FILTER ELEMENT, IN PARTICULAR BY USING SUCH A FILTER DEVICE

BACKGROUND OF THE INVENTION

The invention relates to a filter device comprising a housing in which at least one filter element is arranged that comprises an interior surrounded by a filter material and that is flowed through by a raw gas from the exterior to the interior. The filter device comprises further a cleaning device that comprises at least one compressed air line provided with an outlet opening wherein compressed air flowing out of the outlet opening loads the filter element from the interior. The invention also concerns a method for cleaning at least one filter element, in particular by using a filter device of the aforementioned kind.

Raw gas that contains contaminants is passed through the filter elements. The filter elements retain the contaminants while the raw gas passes through the filter element and is sucked off as clean gas. Over time, the exterior side of the filter element will become clogged with contaminants so that cleaning is required. For this purpose, compressed air is blown through the filter element in a direction opposite to the direction of the raw gas flow so that the contaminants that are adhering to the exterior side of the filter element are removed. In order for the compressed air to act on the entire filter surface area, the outlet opening must have an appropriately large distance from the filter element so that the compressed air stream exiting from the outlet opening can act on the entire filter surface area. When the filter elements have a large diameter, correspondingly large distances between the outlet opening and the filter element are required. Accordingly, a significant mounting space for the filter elements and the associated cleaning device is required. During the cleaning process, the supply of raw gas must be interrupted. This has a negative effect on the efficiency of the filter device.

SUMMARY OF THE INVENTION

It is an object of the present invention to embody the filter device of the aforementioned kind and the method of the aforementioned kind in such a way that a compact configuration of the filter device and a reliable cleaning action of the filter elements are made possible without appreciably impairing the efficiency of the filter device.

In accordance with the present invention, this is achieved in that the interior of the filter element is divided into at least two interior chambers that are separated from each other and in that each interior chamber has associated therewith at least one compressed air line in which a valve is seated, respectively.

In regard to the method of the present invention, the object is achieved in that the filter surface area is loaded sectionwise sequentially with compressed air.

In the filter device according to the invention, the interior of the filter element surrounded or enclosed by the filter material is divided into at least two interior chambers that are separated from each other. Each one of these interior chambers has associated therewith a compressed air line in which a valve is seated, respectively. In this way, it is possible to clean each interior chamber independently in that by means of the associated compressed air line and the open valve compressed air can be supplied in order to load the filter material in the area of this interior chamber from the interior and to blow off the contaminants which are adhering to the exterior side of the filter material. At the time when the cleaning action of the partial surface area of the filter material by means of the compressed air is performed, this partial surface area is not available for purification of the raw gas. During this cleaning process, the filtration of the raw gas can however be continued in that, in this situation, the raw gas passes in the area of the other interior chamber through the filter material from the exterior to the interior. The partial surface area of the filter material of the other interior chamber is sufficient for reliable purification of the raw gas. Since filtration must not be switched off during the cleaning process, the filter device according to the invention is characterized by a high efficiency.

Additionally, the outlet opening of the respective compressed air line can have a relatively small distance to the filter element because only the filter surface area associated with the interior chamber to be employed must be loaded with compressed air. The filter device is therefore characterized by a compact size (small dimensions).

Advantageously, the interior chambers are separated from each other by at least one partition or separation wall. The partition can be inserted simply into the filter element. When only one separation wall or partition is employed, the interior is divided into two interior chambers. However, the separation can be realized advantageously also such that three, four, or more interior chambers are formed. In these cases, each interior chamber has also associated therewith a corresponding compressed air line with associated valve. In accordance with the increasing number of interior chambers, the size of the filter surface area to be cleaned is reduced so that, accordingly, the distance between the outlet opening of the compressed air line and the filter element can be kept small, which has an advantageous effect on the compact configuration of the filter device. During the cleaning action, only the valve that is correlated with the interior chamber to be cleaned is open while the other valves are closed.

The interior chambers are advantageously delimited by the filter material in outward direction. Due to the at least one separation wall or partition, the compressed air which is flowing into the interior chamber cannot flow into the neighboring interior chamber but passes through the filter element from the interior to the exterior so that contaminants which are adhering to the exterior of the filter material are detached (removed).

Preferably, the interior chambers are all of the same size so that about the circumference of the filter element a uniform cleaning action of the filter material is provided.

In order to provide, despite the compact configuration, a large filter surface area, the filter material extends in a zigzag shape about the circumference of the filter element. Due to the thus formed large filter surface area, the temporal intervals between sequential cleaning processes can be relatively large; this also has an advantageous effect on the efficiency of the filter device.

The interior of the filter element can have a round or angular cross-section. In a preferred embodiment, the interior chamber of the filter element has an approximately circular or oval cross-section. In case of a zigzag-shaped course, the inwardly positioned fold edges of the filter material are located on an inner circle.

Preferably, the valves are connected to a control unit. In this case, an automatic cleaning action of the filter element is possible. The cleaning process can be performed by time control.

Preferably, the control unit is however provided such that a cleaning action is initiated when the pressure difference between the raw gas side and the clean gas side surpasses a certain critical value. As long as the filter surface area is still sufficiently free of contaminants, the pressure upstream and downstream the filter element is approximately identical. With increasing degree of clogging of the filter material, the pressure difference however increases. The pressures upstream and downstream of the filter element can be detected by appropriate pressure sensors whose signals are fed to the control unit. As soon as the critical pressure difference value has been reached, the control unit initiates the cleaning process in that the respective valve associated with the interior chamber is opened.

Advantageously, each one of the interior chambers of the filter element is monitored by the control unit in the described way so that the cleaning action is initiated for the respective interior chamber only when the degree of soiling makes this necessary. Performing the cleaning action as a function of the degree of soiling of the filter material increases the efficiency of the filter device.

Advantageously, at least one raw gas line is connected to the housing of the filter device by means of which the raw gas to be filtered is introduced into the interior of the housing. In the flow direction of the raw gas downstream of the filter element, at least one suction line is connected to the housing by means of which the clean gas from which the contaminants have been removed can be removed by suction.

The method according to the invention is characterized in that the filter surface area is loaded sectionwise sequentially with compressed air. The compressed air stream must therefore not be so large that it can act on the entire filter surface area. Accordingly, in a targeted fashion individual areas of the filter surface area can be reliably loaded with compressed air in order to detach or remove the contaminants adhering to the exterior side of the filter material.

In order to ensure an optimal cleaning action of the filter surface area, the interior that is surrounded by the filter material is divided into at least two interior chambers separated from each other. Compressed air is introduced into them sequentially at timed intervals. The compressed air acts thus only onto that part of the filter surface area that is correlated with interior chamber currently loaded with compressed air. The filter surface area of the interior chamber that is not loaded with compressed air is available for filtration of the raw gas so that the supply of raw gas must not be interrupted during the cleaning action.

The subject matter of the present invention not only results from the subject matter of the individual claims but also from all disclosures and features disclosed in the drawings and in the description. They are claimed as being relevant to the invention even though they may not be subject matter of the claims inasmuch as they individually or in combination are novel relative to the prior art.

Further features of the invention result from the additional claims, the description, and the drawings.

BRIEF DESCRIPTION OF THE DRAWING

The invention will be explained in more detail in the following with the aid of an embodiment shown in the drawings.

DESCRIPTION OF THE PREFERRED EMBODIMENTS

Figure 1:
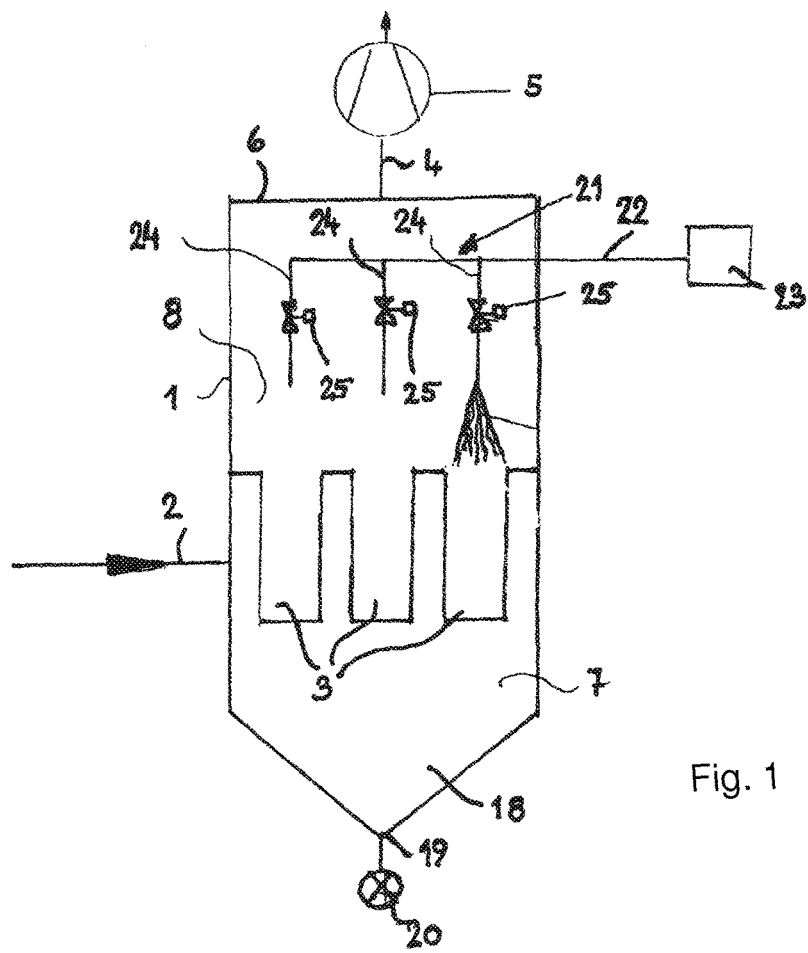
FIG. 1 is a schematic illustration of a filter device according to the invention.

The filter device serves to retain contaminants that are contained in a raw gas. The filter device comprises at least one housing 1 into which at least one raw gas line 2 opens. In the housing 1, at least one filter element 3 is provided through which the raw gas flows from the exterior to the interior. The purified raw gas is sucked out of the housing 1 as clean gas via at least one suction line 4 by means of the fan 5. The suction line 4 is connected advantageously to the top area 6 of the housing 1.

The area of the housing 1 that is upstream of the filter element 3 in the flow direction of the raw gas is a raw gas area 7 of the housing 1 which is separated by the filter element 3 from a clean gas area 8 that is downstream of the filter element 3 in the flow direction of the raw gas.

In the illustrated embodiment, several filter elements 3 are arranged within the housing 1; in the embodiment three such filter element are provided. The number of the filter elements 3 in the housing varies depending on the intended use of the filter device.

Figure 3:
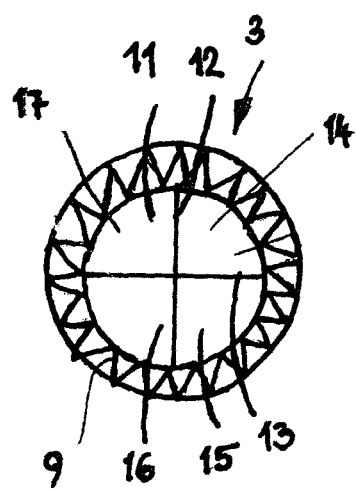
FIG. 3 is a schematic plan view of the filter element according to FIG. 2.

The filter element 3 is advantageously designed as a cylinder-shaped filter cartridge. The filter material 9 is folded about the circumference of the filter element 3 advantageously in a zigzag shape (FIG. 3) so that a large filter surface area is available while only a small space is needed. The filter material 9, as is known in the art, is connected to a sealing flange 10 by means of which the filter element 3 is mounted in the housing 1 in a well known way. The filter material 9 delimits a cylindrical interior 11 which is divided into four interior chambers 14, 15, 16, 17 in the embodiment by two partitions 12, 13 that are perpendicularly crossing each other. In radial section, the interior chambers 14, 15, 16, 17 have the shape of a circular sector. The separation walls (partitions) 12, 13 extend across the entire height of the filter material 9 and are arranged relative to each other in such a way that the interior chambers 14, 15, 16, 17 are each of the same size. By means of the separation walls 12, 13, the interior chambers 14, 15, 16, 17 are sealed relative to each other. The partitions 12, 13 can be made of metallic material, for example, sheet metal, but can also be made of appropriate hard plastic material.

The interior chambers 14, 15, 16, 17 are open in the direction of the suction line 4. The raw gas that passes through the raw gas line 2 into the housing 1 flows through the filter element 3 and reaches the interior chambers 14, 15, 16, 17. As the raw gas pass through the filter element 3, the contaminants contained in the raw gas are retained by the filter element 3. The clean gas exiting from the filter element 3 flows upwardly into the suction line 4.

Over time, the filter elements 3 will clog at the exterior side so that the filtering action decreases accordingly. For this reason, the filter elements 3 are cleaned either as a function of time or as a function of the degree of soiling in that the filter element 3 is loaded from the interior with a compressed air pulse. The pulse is so strong that the contaminants which are attached to the exterior side of the filter material 9 are blown off and fall downwardly into the collecting space 18 of the housing 1. The collecting pace 18 is of a funnel shape so that the contaminants which are collecting in the collecting space 18 can be reliably discharged. At the lower end of the collecting space 18, there is an outlet line 19 to which is connected a discharge unit 20 with which the contaminants can be removed from the collecting space 18.

A cleaning device 21 for cleaning the filter elements 3 is arranged in the housing 1. It comprises at least one compressed air line 22 which is connected to a compressed air source 23. Within the housing 1, lines 24 are branching off the compressed air line 22 and a valve 25 is seated in each of the lines 24. The lines 24 are positioned at a distance above the interior chambers 14, 15, 16, 17 of the respective filter element 3.

The compressed air source 23 is advantageously a compressed air tank in which the compressed air is stored. The pressure is, for example, approximately 3 bar to 7 bar.

The outlet opening 26 of the lines 24 is positioned at such a distance above the filter element 3 that the compressed air which is exiting from the outlet opening 26 loads the entire cross-section of the filter material 9 in the area of the corresponding interior chambers 14, 15, 16, 17 of the filter element 3. The opening angle 27 of the exiting stream is in a range of approximately only 11° to 12°. It is sufficient to load the filter material 9 within the respective interior chamber 14, 15, 16, 17 with the compressed air such that the contaminants on the exterior side of the filter material 9 can be reliably blown off. The distance of the outlet openings 26 is selected such that the greatest possible compressed air quantity can be supplied to the filter element 3.

When cleaning the filter element 3, the interior chambers 14, 15, 16, 17 are not loaded with compressed air at the same time. Advantageously, only one of these interior chambers 14, 15, 16, 17 is loaded with compressed air and during the cleaning action the respective interior chamber is not available for the filtering process. The remaining three interior chambers are however still available for filtration of the raw gas. Therefore, during the cleaning phase, a sufficiently large filter surface area is available in order to reliably retain the contaminants contained in the raw gas. As soon as said one interior chamber has been cleaned, the valve 25 is switched off and the next valve is opened so that the next interior chamber can be loaded with compressed air.

In the exemplary embodiment which is illustrated in the drawings, the interior of the filter element 3 is divided into four interior chambers 14 to 17 of the same size. In such an embodiment, it is advantageous when sequentially only one interior chamber is loaded with compressed air. During the cleaning process, three quarters of the filter surface area are therefore still available for the filtering process.

Figure 1A:
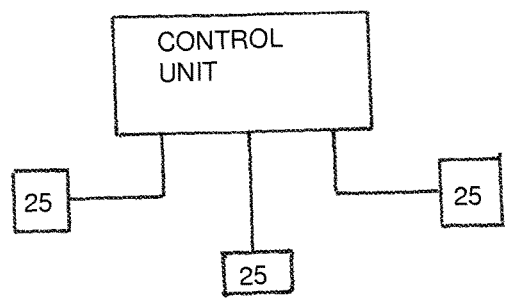
FIG. 1*a* shows schematically a control unit acting on the valves of the cleaning device of the filter device.
Figure 2:
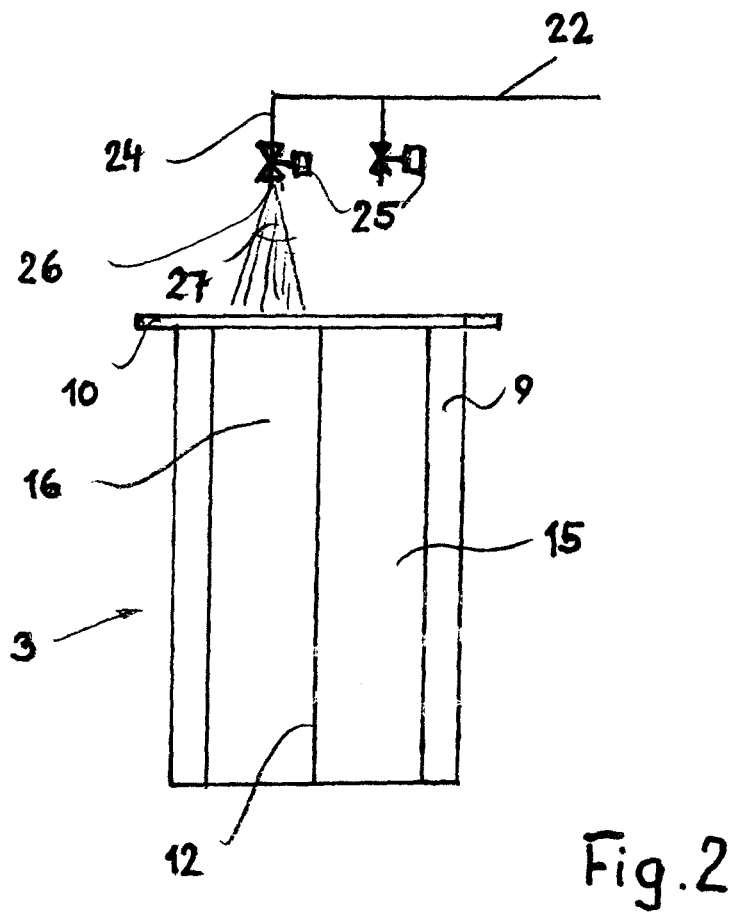
FIG. 2 is a schematic illustration of a filter element of the filter device according to the invention.

The valves 25, advantageously solenoid valves, are actuated by means of an appropriate control unit (FIG. 1a). There is the possibility to load, for example, two interior chambers at the same time with compressed air for cleaning the filter element. For example, two adjacently positioned interior chambers 14, 15 or 16, 17 but also diagonally opposed interior chambers 14, 16 or 15, 17 can be simultaneously loaded with compressed air.

Since for each interior chamber 14, 15, 16, 17, one valve 25 is available, respectively, there is the possibility to position the outlet openings 26 closer to the filter element 3. In this way, in particular small filters with air output of, for example, 300 m³ per hour to 1,500 m³ per hour can be inexpensively and compactly designed without there being the risk that contaminants collecting in the collecting space 18 during the cleaning process are thrown back ("throwback") against the exterior side of the filter material as a result of pressure changes.

Since in the embodiment the interior of the filter element 3 is divided into four interior chambers 14, 15, 16, 17 of the same size, during the cleaning process a uniform suction performance of the filter device is maintained. Also, "throwback" of separated contaminants can be reliably prevented.

Figure 4:
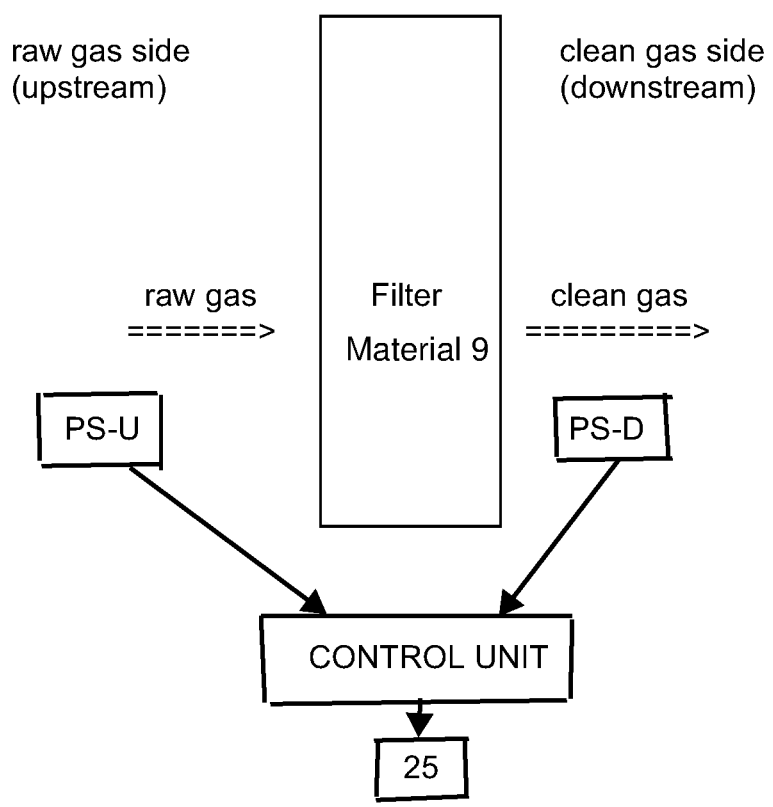
FIG. 4 shows schematically the arrangement of pressure sensors for determining the pressure difference between upstream side and downstream side of the filter element.

Preferably, a control unit is provided such that a cleaning action is initiated when the pressure difference between the raw gas side and the clean gas side surpasses a certain critical value. As long as the filter surface area is still sufficiently free of contaminants, the pressure upstream and downstream of the filter element 3 is approximately identical. With increasing degree of clogging of the filter material, the pressure difference however increases. The pressures upstream and downstream of the filter element 3 can be detected by appropriate pressure sensors PS-U (upstream) and PS-D (downstream) whose signals are fed to the control unit (see schematic of FIG. 4). As soon as the critical pressure difference value has been reached, the control unit initiates the cleaning process in that the respective valve 25 associated with the interior chamber (14, 15, 16, or 17) is opened. Advantageously, each one of the interior chambers 14, 15, 16, 17 of the filter element is monitored by the control unit in the described way so that the cleaning action is initiated for the respective interior chamber only when the degree of soiling makes this necessary. Performing the cleaning action as a function of the degree of soiling of the filter material 9 increases the efficiency of the filter device.

In another embodiment, not illustrated, the interior of the filter element 3 may be divided into three interior chambers of the same size. In this case, the separation walls or partitions are not positioned at a right angle to each other but at an angle of 120°. In such a configuration, the cleaning device has three valves 25 that are correlated with one of the interior chambers, respectively.

In a very simple configuration, the interior of the filter element is separated into two interior chambers of the same size. In this case, only a single separation wall or partition is required.

The compressed air is advantageously discharged in a pulsed fashion from the outlet opening 26. Due to the compressed air pulse, the contaminants on the exterior side of the filter material 9 are reliably blown off. Even contaminants that are adhering more strongly on the filter material 9 are thus reliably detached or removed.

The interior of the filter elements 3 is closed at the side which is facing the collecting space 18. The partitions 12, 13 can thus be simply placed into the filter element 3. The filter elements 3, as a result of the separation into the interior chambers 14, 15, 16, 17 and the thus obtained optimal cleaning action, can be embodied to be relatively small and compact so that the filter device as a whole can be of a small size.

The filter elements 3 must not have an approximately circular interior in cross-section. The filter elements 3 and thus their interior can also have a different round shape in cross-section, for example, an oval shape, or can have an angular shape in cross-section.

The specification incorporates by reference the entire disclosure of German priority document 10 2014 006 473.5 having a filing date of Apr. 29, 2014.

While specific embodiments of the invention have been shown and described in detail to illustrate the inventive principles, it will be understood that the invention may be embodied otherwise without departing from such principles.

What is claimed is:

1. A filter device comprising:
a housing;

at least one raw gas line connected to the housing;
a cleaning device comprising a compressed air source and further comprising a compressed air line connected to the compressed air source;
the cleaning device further comprising branch lines branching off the compressed air line, wherein the branch lines each have a valve and an outlet opening;
a control unit, wherein the valves are connected to the control unit;
at least one filter element arranged in the housing;
the at least one filter element comprising a filter material formed to a cylinder, wherein the filter material is zigzag-folded about an entire circumference of the cylinder, wherein the cylinder is arranged upright and defines a cylindrical interior surrounded by the zigzag-folded filter material, wherein the at least one filter element is configured to allow a raw gas supplied via the at least one raw gas line to pass through the at least one filter element from an exterior of the at least one filter element to the cylindrical interior;
the cylindrical interior of the at least one filter element divided by at least one partition into at least two interior chambers that are separated from each other and sealed relative to each other by the at least one partition to prevent gas flow between them, wherein the at least one partition extends upright across an entire axial height of the zigzag-folded filter material in a direction of a cylinder axis of the cylinder, wherein radial outer edges of the at least one partition extending upright across the entire axial height are seal-tightly connected to an inner side of the filter material facing the cylindrical interior;
the at least two interior chambers each having associated therewith one of the branch lines, wherein the outlet openings of the branch lines are positioned above the at least one filter element and above the at least two interior chambers of the at least one filter element, wherein through the outlet openings compressed air flows into the interior of the at least one filter element for loading the interior of the at least one filter element with compressed air;
pressure sensors configured to measure a pressure upstream of the filter material and a pressure downstream of the filter material independently for each one of the at least two interior chambers to determine a predetermined pressure difference value between the pressures upstream and downstream of the filter material separately for each one of the at least two interior chambers, wherein the pressure sensors are connected to the control unit and, when the predetermined pressure difference value between the pressures upstream and downstream of the filter material is reached in one of the at least two interior chambers, the control unit actuates the valve associated with said one interior chamber.

2. The filter device according to claim 1, wherein the at least two interior chambers are delimited by the zigzag-folded filter material in a radial outward direction relative to the cylinder axis.

3. The filter device according to claim 1, wherein the at least two interior chambers are of the same size.

4. The filter device according to claim 1, wherein the cylindrical interior has a round cross-section in a radial section relative to the cylinder axis.

5. The filter device according to claim 4, wherein the round cross-section has a circular shape or an oval shape.

6. The filter device according to claim 1, wherein the cylindrical interior has an angular cross-section in a radial section relative to the cylinder axis.

7. The filter device according to claim 1, further comprising at least one suction line connected to the housing downstream of the at least one filter element in a flow direction of the raw gas.

8. A method for cleaning at least one filter element of a filter device according to claim 1, the method comprising:
supplying a compressed air stream from above and spaced at a distance from the at least one filter element to the at least one filter element and to the at least two separate interior chamber;
passing the compressed air stream at an air stream opening angle through the filter material of the at least one filter element of one of the at least two separate interior chambers in a vertical direction from a top of the at least one filter to a bottom of the at least one filter element opposite to a flow direction of a raw gas to be filtered while continuing to allow the raw gas to pass into the other interior chamber or interior chambers.

9. The method according to claim 8, further comprising supplying the compressed air in a temporal sequence to the at least two interior chambers, respectively.

10. The filter device according to claim 1, wherein two of said at least one partition are provided and the cylindrical interior is divided into four of said interior chambers sealed relative to each other by said two partitions to prevent gas flow between them, wherein said two partitions have radial inner edges extending upright across the entire axial height, wherein the radial inner edges are seal-tightly connected to each other.

11. The filter device according to claim 1, wherein three of said at least one partition are provided and the cylindrical interior is divided into three of said interior chambers sealed relative to each other by said three partitions to prevent gas flow between them, wherein said three partitions have radial inner edges extending upright across the entire axial height, wherein the radial inner edges are seal-tightly connected to each other.

* * * * *